United States Patent [19]  [11] 3,815,932
Ruger  [45] June 11, 1974

[54] FRONT GATE CONSTRUCTION FOR SHOPPING CART
[75] Inventor: Verlyn C. Ruger, Bellevue, Mich.
[73] Assignee: Roblin Industries, Inc., Battle Creek, Mich.
[22] Filed: June 1, 1972
[21] Appl. No.: 258,606

[52] U.S. Cl.......................... 280/33.99 F, 186/1 AC
[51] Int. Cl............................................. B62b 11/00
[58] Field of Search............ 280/33.99 R, 33.99 A, 280/33.99 F, 33.99 H, 33.99 S, 33.99 T, DIG. 4; 186/1 AC

[56] References Cited
UNITED STATES PATENTS

| | | | |
|---|---|---|---|
| 3,039,564 | 6/1962 | Shaukis | 280/33.99 F X |
| 3,245,498 | 4/1966 | Stanley et al. | 280/33.99 F X |
| 3,297,108 | 1/1967 | Davis | 280/33.99 F X |
| 3,503,622 | 3/1970 | Romero | 280/33.99 F |
| 3,645,554 | 2/1972 | Von Stein | 280/33.99 R |

Primary Examiner—Kenneth H. Betts
Assistant Examiner—David M. Mitchell
Attorney, Agent, or Firm—Woodhams, Blanchard & Flynn

[57] ABSTRACT

A gate construction for a shopping cart receptacle. The gate construction includes a gate panel disposed between sidewalls of the receptacle for closing an end of the receptacle. The gate panel is supported adjacent its lower edge near the bottom wall of the basket for pivotal and generally upward sliding movement. A latch member is fixed to and extends along the edge of the gate panel and is offset toward the interior of the receptacle. The receptacle sidewall has a further latch member offset interiorly of the receptacle adjacent the gate panel and which includes an ear which coacts with an opening in the gate panel for preventing outward movement of the receptacle sidewalls, so as to prevent inadvertent unlocking of the gate. The gate latch member and sidewall latch member have oppositely oriented substantially L-shaped portions which normally overlap to prevent opening of the gate and to vertically support the gate panel. Such L-shaped portions are disengaged by raising the gate panel, whereafter the gate panel is free to pivot forwardly about its lower edge for opening the end of the receptacle.

13 Claims, 8 Drawing Figures

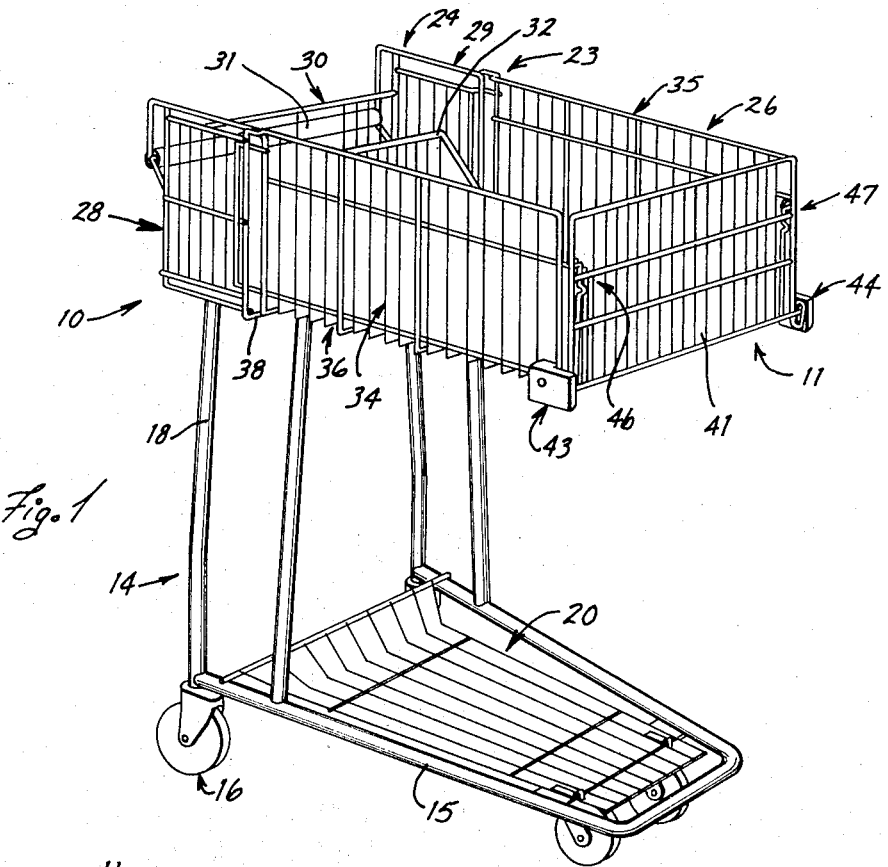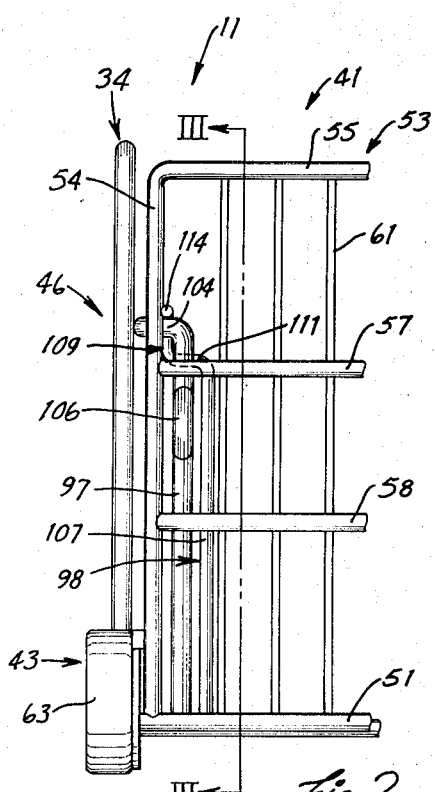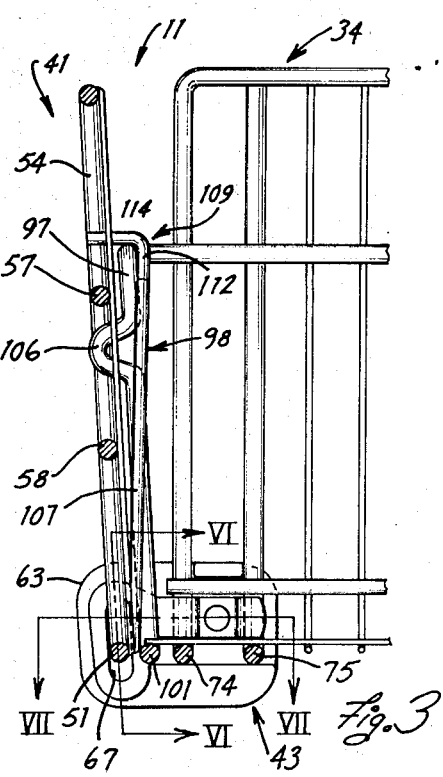

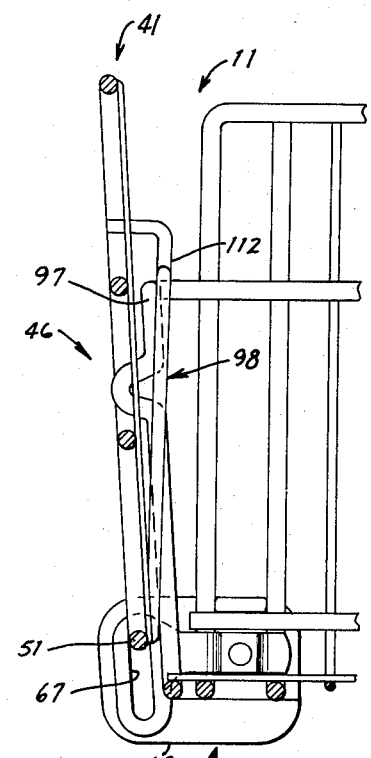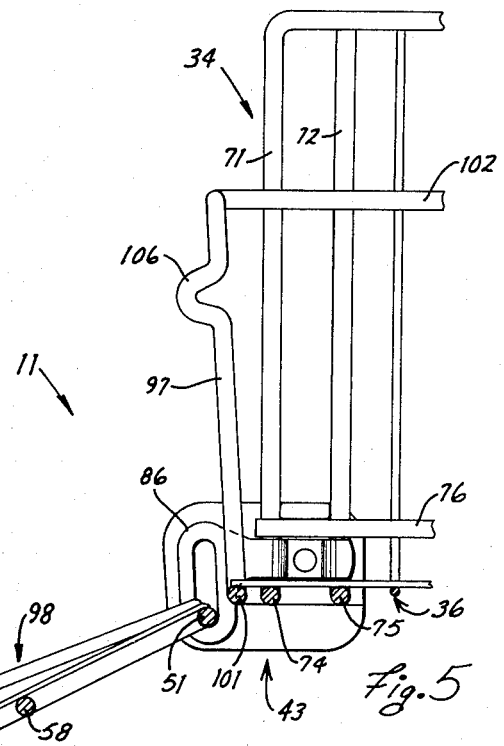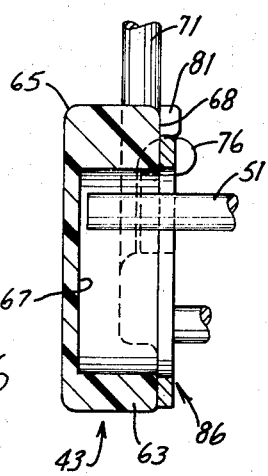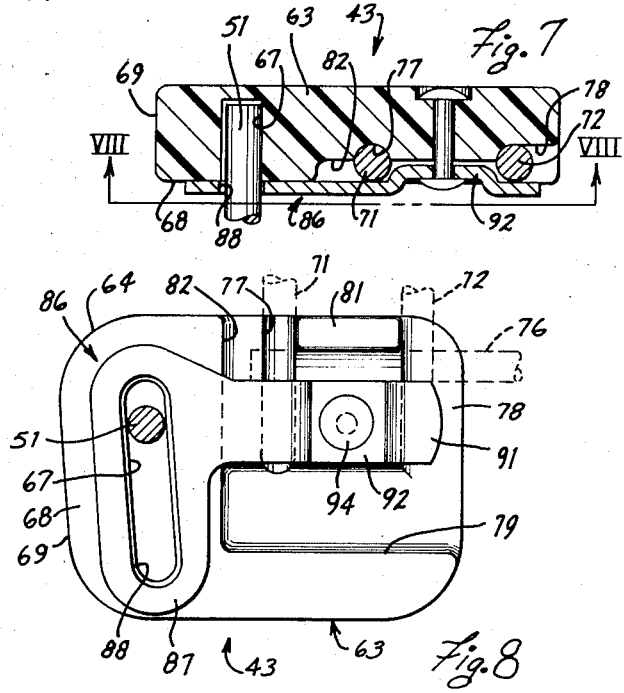

FRONT GATE CONSTRUCTION FOR SHOPPING CART

FIELD OF THE INVENTION

This invention relates to a gate construction for a shopping cart basket and more particularly relates to a gate construction including a gate panel pivotable about an axis near its lower edge for opening an end of the shopping cart basket to facilitate unloading of goods from the basket.

BACKGROUND OF THE INVENTION

The gate construction embodying the present invention is an improvement on shopping cart basket constructions disclosed in U.S. Pat. No. 3 503 622 to Romero, issued Mar. 31, 1970, and in U.S. Pat. No. 3 245 498 to Stanley et al., issued Apr. 12, 1966. The aforementioned patents disclose carts used by customers to transport articles in a supermarket to a checkout counter, more particularly of the type wherein the upper or primary goods receptacle includes a fixed rearward portion and a pivoted forward portion. The pivoted forward portion has a bottom wall, sidewalls and a forward end wall and is pivoted on a substantially horizontal, transverse axis along the rear edge of the bottom wall. Thus, the forward portion of the basket when in a goods receiving or use position extends forwardly from the rear receptacle portion and with its bottom wall substantially horizontal. On the other hand, the forward receptacle portion can be pivoted upwardly about its pivot axis to a storage or nesting position wherein the bottom wall thereof is substantially upstanding. The forward end wall of the forward basket portion is defined by a gate panel pivotable generally along its bottom edge and which in an opened position is adapted to lie for example atop a checkout counter to form a bridge or a continuation of the receptacle bottom wall to facilitate transfer of goods from the cart basket with little or no lifting.

In each of the above-mentioned patents the gate panel must be manipulated by the store customer through a relatively complex set of motions in order to open same. More particularly, the top edge of the gate panel must be moved rearwardly, followed by a lifting movement thereof and thereafter a forward swinging movement to effect opening of the gate. Moreover, the weight of the gate at least in part is supported adjacent its lower edge tending to make the gate unstable in its closed position and requiring latching means for preventing inadvertent opening of the gate due, for example, to small upward motions imparted to the gate by movement of the cart over a bumpy floor. Further, the gate is subject to inadvertent opening if the sidewalls of the receptacle deflected away from each other.

Accordingly, the objects of this invention include provision of:

1. An impoved gate construction for a shopping cart receptacle which can be opened by a single simple upwardly and forwardly directed movement thereof.
2. A gate construction, as aforesaid, in which the weight of the gate in its closed position is carried by means engaging the gate adjacent the upper end thereof and the gate is stable in its closed position, resisting inadvertant unlatching and opening due to sudden vertical movements of the cart caused for example by movement thereof over uneven or rough textured floors.
3. A gate construction, as aforesaid, in which outward movement of the receptacle sidewalls away from each other in the region adjacent the gate is positively limited and in which inadvertent unlatching and opening of the gate due to sideward loading of such sidewalls is positively prevented.
4. A gate construction, as aforesaid, which incorporates bumpers engageable, for example, with a checkout counter edge and including means pivotally and slideably locating the lower gate edge.
5. A gate construction, as aforesaid, particularly adapted to integration with a shopping cart receptacle of rod and wire mesh construction and in which the members for latching the gate in its closed position and preventing outward deflection of the receptacle sidewalls include rodlike members incorporated in the gate mesh and sidewall mesh.

Other objects and purposes of this invention will be apparent to persons acquainted with apparatus of the general type upon reading the following specification and inspecting the accompanying drawings.

BRIEF DESCRIPTION OF THE DRAWINGS

FIG. 1 is a perspective view of a shopping cart having a gate construction embodying the present invention.

FIG. 2 is an enlarged, fragmentary front elevational view of the receptacle of FIG. 1.

FIG. 3 is a sectional view substantially taken on the line III—III of FIG. 2 and showing the gate in its normal closed position.

FIG. 4 is a view similar to FIG. 3 showing the gate in a raised position preparatory to opening.

FIG. 5 is a view similar to FIG. 3 and showing the gate in an open position.

FIG. 6 is an enlarged fragmentary sectional view substantially taken on the line VI—VI of FIG. 3.

FIG. 7 is an enlarged sectional view substantially taken on the line VII—VII of FIG. 3.

FIG. 8 is a sectional view substantially taken on the line VIII—VIII of FIG. 7.

Certain terminology will be used in the following description for convenience in reference only and will not be limiting. The words "up," "down," "right" and "left" will designate directions in the drawings to which reference is made. The words "front" and "rear" will refer to the ends of the cart which lie respectively to the right and to the left in FIG. 1. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by porviding a gate construction for a shopping receptacle. The gate construction includes a gate panel disposed between sidewalls of the receptacle for closing an end of the receptacle. The gate panel is supported adjacent its lower edge near the bottom wall of the basket for pivotal and generally upwardly sliding movement. A latch member is fixed to and extends along the edge of the gate panel and is offset toward the interior of the receptacle. The receptacle sidewall has a further latch member offset interiorly of the receptacle adjacent the gate panel and which includes an ear which coacts with an opening in the gate panel for preventing outward movement of the receptacle sidewalls, so as to prevent inadvertent unlocking of the gate. The gate latch member and sidewall latch member have oppositely oriented substantially L-shaped portions which normally overlap to prevent opening of the gate and to vertically support the gate panel. Such L-shaped portions are disengaged by raising the gate panel, whereafter the gate panel is free to pivot forwardly about its lower edge for opening the end of the receptacle.

DETAILED DESCRIPTION

FIG. 1 discloses a shopping cart 10 having a gate construction generally indicated at 11 embodying the invention. Although the gate construction embodying the invention may be used with a variety of shopping carts, it was particularly intended for and is advantageously usable with a cart 10 of the type shown. The cart 10 includes a framework 14 preferably constructed of metal tubing and including a forwardly tapering lower base member 15. The lower base member 15 is supported by casters 16 at its forward and rearward ends. A pair of upstanding tubes 18 are fixed on each side of the base member 15, adjacent its end, for supporting at their upper ends a substantially horizontal upper frame member, not shown. Such upper frame member is preferably similar in configuration to the lower member 15 and overlies same, but does not extend as far forwardly thereas. A shelf 20 preferably of rod and wire mesh may be provided on the lower base member for carrying goods. The shelf 20 is preferably pivotable about a transverse axis adjacent it forward end, the rearward end of said shelf rising to allow nesting of another and similar cart from behind the cart 10.

A substantially rectangular, upwardly opening receptacle 23 is supported on the framework 14, more particularly on said upper base member, and comprises a fixed rearward portion 24 and a pivotable forward portion 26. The receptacle 23 may be of any convenient construction, but in the preferred embodiment shown is of rod and wire mesh construction. The fixed rearward portion comprises sidewalls 28 and 29, an upstanding rear wall 30 and a bottom wall, not shown. A handle 31 is spaced rearwardly from the rear wall 30 and fixed to the rearward receptacle portion 24 for enabling a user to move the cart 10 from place to place. If desire, the fixed receptacle portion may be fitted with an infant seat including a movable back rest 32.

The pivotal forward receptacle portion 26 includes side walls 34 and 35, a bottom wall generally indicated at 36 and a forward end wall, here defined by the gate construction 11. The side walls 34 and 35 are preferably spaced to receive the side walls 28 and 29 of the rear receptacle portion therebetween. A perimeter rod member 39 defines the rearward edge of the bottom wall of the forward receptacle portion 26. The perimeter rod member 38 is pivotally supported by means not shown on the framework 14 to enable the forward receptacle portion 26 to pivot upwardly and rearwardly thereabout so that the bottom wall 36 thereof is upstanding and the side walls 34 and 35 thereof fit over the side walls 28 and 29 of the rearward receptacle portion 24. Such an upward pivoting of the forward receptacle portion 26 out of its position of use shown in FIG. 1 allows nesting of the cart 10 behind a further and similar cart.

The cart 10 to the extent above described is generally similar to the carts disclosed in the aforementioned U.S. Pat. Nos. 3 245 498 and 3 503 522 and is thus believed to require no further description.

The gate construction 11 includes a substantially planar gate panel 41, preferably of rod and wire mesh construction. The gate panel 41 is located adjacent its bottom edge on the receptacle 23 by bracket units 43 and 44. The bracket units 43 and 44 are located at the forward edge of the receptacle 23 at the junction of the bottom wall 36 with the respective side walls 34 and 35. Latch units, generally indicated at 46 and 47, support the gate panel 41 in its closed position (shown in FIG. 1) adjacent the upper end thereof on the side walls 34 and 35.

The gate panel 41 comprises a bottom or pivot bar 51 (FIGS. 2 and 5) which extends transversely between and engages, in a manner hereinafter described, the bracket units 43 and 44. A frame bar 53 is substantially of inverted U-shape and has spaced, substantially upstanding side bars 54 fixed, as by welding, to the pivot bar 51 adjacent opposite ens thereof. The upper ends of the side bars are connected by a preferably integral bight bar 55. Intermediate bars 57 and 58 extend laterally between side bars 54 and are fixed thereto, as by welding. The intermediate bars 57 and 58 are spaced from each other and between the pivot bar 51 and bight bar 53. A plurality of transversely spaced, upstanding wires 61 are distributed across the width of the gate panel 41 and are fixed preferably to the interior faces of the bars 51, 53 57 and 58, as by welding.

The bracket units 43 and 44 (FIG. 1) are preferably mirror images of each other. Thus, description of the bracket unit 43 will also suffice for bracket unit 44. The bracket unit 43 FIGS. 6-8) includes a bumper member 63 which is preferably a substantially rectilinear block of molded plastic material, such as linear polyethylene, and is substantially rigid. The edges of the bumper member 63 are preferably rounded, as indicated for example at 64 and 65. An elongate slot 67 is provided in the interior face 68 of the block 63 near the forward end 69 thereof. The slot 67 extends through the majority of the height of the block 63 and is preferably sloped at about 5° as to the vertical, its upper end being offset forwardly from its lower end. The forward face 69 of the block is preferably correspondingly sloped. The slot 67 is adapted to receive therein, for sliding motion up and down therealong and for pivotal movement, the adjacent end of the pivot bar 51 of gate panel 41.

In the particular embodiment shown, the receptacle side wall 34 has a forward edge defined by an upstanding perimeter rod 71. An upstanding backing rod 72 is fixed with respect to and parallels the rod 71 and is rearwardly spaced therefrom. The side wall 34 includes a further, substantially horizontal rod 76 spaced above the receptacle bottom wall 36 and fixed to the interior faces of upstanding rods 71 and 72. Similarly, the bottom wall 36 of the receptacle has a forward edge edge defined by a transversely extending perimeter rod 74, which is preferably a substantially right angle extension of the rod 71, and a rearwardly displaced backing rod 75, which is preferably a right angle extension of backing rod 72.

To mechanically interlock, against pivotal movement in the plane of the side wall 34, the bumper member 63 with respect to such side wall, the upper rearward quadrant of the interior face 68 of such bumper member is contoured corresponding to the rods 71 and 72 and the extensions 74 and 75 thereof. More particularly, the interior face 68 of the bumper member 63 has an upstanding groove 77 intermediate the ends thereof, which extends through the upper face of the bumper member and a corresponding depression 78, opening through the rearward and upper faces of the bumper member for receiving, respectively, the rods 71 and 72. The groove 77 and depression 78 communicate at their lower ends with a further, forwardly extending depression 79 which receives the receptacle bottom wall rods 74 and 75. A raised abutment 81 extends from the interior face 68 of the bumper member along the upper edge thereof, between the groove 77 and depression 78. The abutment extends between and interiorly somewhat beyond the rods 71 and 72 of the receptacle side wall. The abutment 81 is adapted to rest upon the horizontal side wall rod 76. The remaining portion of the interior face 68 above the depression 79 is also depressed as indicated at 82, though to a lesser extent than groove 77 and depressions 78 and 79.

The bracket unit 43 further includes a platelike bracket 86 adapted to rest against the interior face 68 of the bumper member 63. The bracket 86 is substantially T-shaped and includes at its forward end a head portion 87 which lies snugly against the interior face 68 and is provided with a slot 88 in registry with the slot 67 in the bumper member. The bracket 86 further includes a leg 91 which extends rearwardly from head 87 and snugly overlies the side wall rods 71 and 72, immediately below the rod 76 and closely above the bottom wall 36 of the cart receptacle. The portion 92 of the bracket leg 91 lying immediately between rods 71 and 72 is upset exteriorly and is close spaced to the opposed face of the shallow depression 82. Suitable fastening means, here a rivet, 94 extends through coaxial openings in the bumper member 63 and the opposed upset portion 92 of bracket leg 91 for securing the bracket 86 to the interior face of the bumper member 63 with the side wall rods 71 and 72 tightly sandwiched therebetween whereby the bracket unit 43 is fixedly secured to the receptacle.

The latch units 46 and 47 are preferably mirror images of each other and a description of the latch unit 46 will suffice for both. The latch unit 46 (FIGS. 2 and 5) includes a receptacle mounted member 97 arranged for latching coaction with a gate mounted member 98. The receptacle mounted, or fixed, latch member 97 comprises a substantially upstanding bar or rod preferably forwardly inclined toward its upper end, here at about a 4° angle to the vertical. The gate panel 41, when in its closed position of FIG. 3, is preferably somewhat forwardly sloped, substantially in parallelism with the fixed latch member 97.

The latch member 97 is spaced inboard of the receptacle side wall 34 and is spaced closely inboard of the adjacent side bar 54 of the gate panel 41 when the latter is in its closed position of FIGS. 2 and 3.

In the preferred embodiment shown, the fixed member 97 is an integral continuation of, and is substantially at right angles to, a pair of rods 101 and 102 integrated in the receptacle bottom wall 36 and side wall 34. More particularly, the rod 102 runs substantially the length of the side wall 34 on the interior side thereof and is located in the upper half of such side wall in spaced relation to the top edge thereof. The rod 102 is preferably secured by welding to the vertical members of the side wall 34, including the perimeter rod 71 and backing rod 72, and acts as a reinforcing element of the side wall. The rod 101 extends forwardly past the perimeter rod 71 connecting to the fixed latch member 97 through a short horizontal segment 104, preferably at right angles to both the fixed latch member 97 and the rod 101. The bottom end of the fixed latch member 97 preferably integrally connects to the rod 101. The rod 101 is preferably coplanar with rods 74 and 75 of the receptacle bottom wall 36. The rod 101 extends transversely of the bottom wall 36 and is closely and substantially equally spaced between the rod 74 and the slot 67 in the bumper member 63.

The fixed latch member 97 is deformed to provide a generally V-shaped forwardly extending ear 106 adjacent, but spaced from, the upper end thereof. The ear 106 extends forwardly sufficiently to overlap the adjacent side bar 54 of the gate panel 41 when the latter is in its closed position of FIG. 3. In such position, the ear 106 is located between the intermediate bars 57 and 58 of the gate member and is closer to the upper intermediate bar 57 than to lower bar 58, so as to allow upward travel of the gate panel 41 to the limit established by interference between the pivot bar 51 and the upper end of the bumper member slot 67.

The gate mounted or movable latch member 98 (FIGS. 2 and 5) includes an elongate, preferably linear and rodlike lower segment 107. The segment 107 is fixed, as by welding, to the normally rearward face of the gate pivot bar 51 and extends upwardly as seen in FIG. 3 along the interior face of the gate and at a shallow angle, here about 5°, thereto. In the closed condition of the gate shown in FIG. 3, the segment 107 is substantially vertical or slightly inclined at its upper end interiorly of the receptacle. When seen from the front as in FIG. 2, the segment 107 parallels the side wall 34 and is spaced interiorly from the gate side bar 54 and from the fixed latch member 97. The segment 107 extends slightly above the gate intermediate bar 57 but does not reach the height of the top of the fixed latch member 97.

The movable latch member 98 further includes a substantially L-shaped segment 109 connected to the lower segment 107 at the upper end thereof and extending exteriorly and then upwardly therefrom, the L-shaped segment 109 lying in the same transverse plane as the lower segment 107. The L-shaped segment 109 includes a substantially horizontal portion 111 connected to and extending outboard from the top of the lower segment 107 and a substantially vertical portion 112 extending substantially upwardly from the outboard end of portion 111. The L-shaped segment 109, in the closed position of the gate shown in FIGS. 2 and 3, lies rearwardly of, and in overlapping contact with the fixed latch member 97 and its connected horizontal segment 104.

The movable latch member 98 further includes a support segment 114 (FIGS. 2 and 3) which extends forwardly from the upper end of portion 112 and is fixed, preferably by welding, to the inboard face of gate panel side bar 54. The support segment 114, in the closed position of the gate shown in FIGS. 2 and 3, rests atop the fixed horizontal rod segment 104 of the fixed latch member 97 for supporting the closed gate. In such position the pivot rod 51, defining the lower edge of the gate, is substantially coplanar with receptacle bottom wall rods 101, 74 and 75 and is spaced above the bottom of the slot 67 in the bumper member 63. Thus, the weight of the gate panel is carried by the movable latch member segment 114 and fixed latch member segment 104. The spacing of the L-shaped segment 109 from the rearwardly facing surface of the panel 41 exceeds the thickness of the fixed latch member 97 and its horizontal segment 104 to enable the gate to be raised, as seen in FIG. 4, sufficiently that the L-shaped segment 112 of the movable latch member 98 lies above and hence clears the top of the fixed latch member 97, whereat the pivot bar 51 of the gate panel lies at the top of the slot 67 in the bumper member 63, and whereby the gate panel can be freely pivoted forwardly about the axis of pivot bar 51 to its open position of FIG. 5.

OPERATION

The gate construction 11 is installed on the forward end of the cart receptacle 23 in the following manner. Each of the brackets 86, with the corresponding end of the gate pivot bar 51 disposed in the slot 88 thereof, is moved rearwardly into the forward end of the receptacle 23 until the upset portion 92 thereof is disposed adjacent and between the upstanding perimeter rod 71 and backing rod 72 of the adjacent side wall. The leg 91 of each bracket thus is disposed vertically between the bottom receptacle wall 36 and horizontal side wall rod 76 in its final position of installation. The bumper member 63 of each of the bracket units 43 and 44 is then brought laterally inwardly toward the corresponding side wall of the receptacle, receiving the rods 71, 72 and 76 and the ends of bottom wall rods 74 and 75 in corresponding ones of the depressed portions 77, 78, 79 and 82 thereof, to assume its final position of installation in overlapping relation with corresponding brackets 86. The corresponding end of the pivot bar 51 of the gate panel is received in the corresponding slot 67 of the bumper member. A rivet 94 is then applied to fixedly secure the corresponding bracket and bumper member together and thus to the side wall rods 71 and 72 sandwiched therebetween. In this manner, the gate construction is installed on the receptacle.

In operation, the gate panel 41 is moved from its open position of FIG. 5, to its closed position of FIG. 3 by lifting same. Such pivots the gate panel in a clockwise direction, as seen in FIG. 5, and simultaneously lifts the pivot rod 51 to the upper end of the slot 67 in each of the bracket units 43 and 44 so that the gate assumes its intermediate position of FIG. 4. In such position, the L-shaped segment 112 of the movable latch member 98 is above and to the rear of the top of the fixed latch member 97. Thereafter, the gate panel is allowed to fall to its position of FIG. 3 whereat the L-shaped segment of the movable latch member 98 overlaps the upper end of fixed latch member 97 and its horizontal segment 104 thus latching the gate closed. Opening of the gate is accomplished by a reversal of the closing movements above described.

When in its closed position of FIG. 3, the weight of the gate panel 41 is pendently supported, by the segment 114 thereof, on the first horizontal segment 104 of the receptacle, the pivot bar 51 of the gate panel 41 hanging above the bottom of slot 67 and thus not carrying the weight of the gate panel. Consequently, the likelihood of inadvertent opening of the gate, as the cart moves along a rough surfaced floor is reduced, without recourse to fixed elements overlying the closed gate.

Further, outward deflection of the receptacle side walls 34 and 35, sufficient to move the fixed latch element 97 laterally out of contact with the L-shaped segment 112, is precluded by interference between the ear 106 and the side bar 54 due to outward deflection of the side walls 34 and 35 is prevented.

The bumper members 63 of the bracket units 43 and 44 extend forwardly of the gate panel 41 and receptacle side walls and are adapted to abut the adjacent edge of a checkout counter for locating the cart for unloading. The gate is then opened and at least the upper portion thereof lies on the counter to form a ramp between the cart bottom wall and counter top enabling the contents of the cart receptacle to be moved or slid from the receptacle onto the counter without material lifting thereof. In addition, the bumper members tend to prevent damage to the gate, receptacle or counter upon contact of the cart receptacle with the counter top preparatory to unloading of the cart. Further, by appropriate design of the rearward portion of the cart receptacle 23, the bumper member may, upon engaging the rearward end of a similar cart, be utilized to assist or cause upward pivoting of the forward receptacle portion 26 to its upstanding nesting position, not shown.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. For use with a shopping cart receptacle including spaced side walls upstanding from a bottom wall and an open end, the gate construction comprising:
   a gate panel closable for closing said end;
   an elongate first latch rod fixed on a side wall of said receptacle and having first support means extending transversely and in overlapped relation with the closed gate panel;
   an elongate second latch rod fixed on said gate panel including second support means spaced above the bottom gate panel edge and extending transversely of said first support means for pendently supporting the closed gate panel upon said first support means;
   said first and second latch rods having respective first and second overlapped latch means adjacent said first and second support means respectively, said first and second latch means being linearly relatively slidable in response to a forward and upward force on the gate panel for disengaging, to permit subsequent forward opening movement of said gate panel;
   pivotally and slidably interengaged locating means on said receptacle and gate panel spaced below said first support means for limiting gate panel translatory movement to a substantially vertical path beteen limits both spaced above and spaced below the closed level of said gate panel, so as not interfere with pendent support of said closed gate panel by said support means.

2. The gate construction of claim 1 in which said gate panel, first latch means and second latch means define a sequence of substantially parallel planes in the closed position of the gate panel, said first latch rod including limiting means defining a further plane transverse to said planes of first and second latch means.

3. The gate construction of claim 1 in which said first latch means is free of impeding projections in the upward path of movement of said second latch means established by said forward and upward pull on said gate panel.

4. The gate construction of claim 1 in which said locating means on said gate panel includes pivot rod ends extending transversely therefrom adjacent the lower edge thereof, and locating means on said receptacle comprising bracket means fixed on said side walls and including substantially vertically extending slots for pivotally and slidably receiving said rod ends, said slot extending above and below the normal position of said rod ends.

5. The gate construction of claim 4 in which said locating means on said receptable extend forward of said side walls and said first latch rod to act as a bumper, said slot lying substantially below said support means, said first latch rod being sloped upwardly and forwardly substantially from the bottom of said receptacle behind the closed position of the gate.

6. The construction of claim 4 in which said bracket means comprises a bumper block and an overlying substantially rigid platelike bracket, said side wall at least in the area of said bracket means being constructed of a mesh of rodlike elements, said bumper block and bracket being respectively located outside and inside said side wall, means securing said bracket to said bumper block with said rodlike elements of said side wall clamped in sandwiched relationship therebetween for securing said bracket means to said side wall.

7. The gate construction of claim 6 in which the interior face of said bumper block is contoured and conformed to said rodlike elements of said side wall for locking said bracket means against movement in the plane of said side wall.

8. The gate construction of claim 1 including means defining an opening in said gate panel and a forwardly projecting ear on said first latch rod receivable in said gate panel opening in the closed position of said gate panel for preventing outward movement of said side panels by reason of interference between said ear and the perimeter of said gate panel opening.

9. The gate construction of claim 1 in which said first support means includes a transverse, substantially horizontal segment in overlapping relation with the closed position of said panel for positively limiting pivoting of said gate panel into said receptacle, said second support means of said second latch rod including a segment extending longitudinally inboard from said gate panel and adapted to lie atop said horizontal segment of said first support means for vertically supporting said gate panel in its closed position, said segment of said second latch rod being adjacent but spaced from the upper end of said gate.

10. The gate construction of claim 1 in which said first latch rod is spaced transversely inboard of the adjacent side wall and includes a substantially upstanding portion which at its upper end terminates in a substantially horizontal portion extending toward said side wall and comprising said first support means, said second latch rod being substantially upstanding and being spaced inboard of said gate panel and transversely inboard of said first latch rod, said second latch means comprising a segment of said second latch rod extending transversely outwardly past said first latch rod adjacent the upper end thereof, said second latch rod segment and said gate panel sandwiching said first latch rod therebetween in the closed position of the gate whereby a raising of the gate to move said second latch rod segment above the upper end of said first latch rod allows outward pivoting of the upper end of the gate panel to open same.

11. The gate construction of claim 10 in which said segment of said second latch rod is substantially L-shaped comprising a transversely extending reach which at its outboard end terminates in an upstanding reach arranged in overlapping relation with said horizontal portion of said first latch rod in the closed position of said gate, said upstanding reach terminating in its upper end in a substantially horizontal segment connected to said gate panel and adapted to overlie and rest upon said horizontal portion of said first latch rod for supporting the weight of said gate panel and defining said second support means.

12. The gate construction of claim 1 in which said first latch rod extends upwardly and forwardly from the frong edge of said bottom receptacle wall to a location spaced adjacent and below the upper end of said receptacle, said first latch rod being spaced transversely inwardly from the plane of the adjacent side wall, the upper end of said first latch rod connecting to said side wall through a transversely extending substantially horizontal segment defining said first support means, said first latch rod having an outwardly extending ear intermediate the ends thereof substantially paralleling the plane of said side wall, said gate panel being of mesh construction, said second latch rod extending upwardly and being sloped inboard with respect to said plane of said gate panel from adjacency with the lower edge of such gate panel, said second latch rod lying transversely inboard of said first latch rod, said second latch rod having a transversely outwardly and upwardly extending substantially L-shaped segment adjacent the upper end thereof for lying inboard of and overlapping the upper end portion of said first latch rod and said horizontal segment of said first latch rod to prevent outboard movement of said gate panel and define said latch means, said support means comprising a segment extending substantially horizontally inboard from said gate panel to the upper end of said L-shaped segment and adapted for resting upon a portion of said horizontal segment of said first latch rod for pendently supporting said gate panel in the closed position of said gate panel, said ear extending outboard through the plane of said gate panel in the closed position of said gate panel and lying inside the perimeter of said gate panel for preventing outward deflection of the adjacent side wall by interference with the perimeter of said gate panel.

13. The gate construction of claim 12 in which said locating means includes a pivot rod extending along the lower edge of said gate panel and transversely of said receptacle side wall a bumper block lying exteriorly of said side wall adjacent the bottom wall and a sheet-like bracket fixed to said bumper block with a portion of said side wall sandwiched therebetween, said bumper block and bracket extending outboard beyond said side wall and said first latch rod and having an interiorly opening substantially vertically extending slot for receiving a projecting end of said pivot rod of said gate panel, said second latch rod being fixed to said pivot rod inboard of the edge of said gate panel and extending upwardly therefrom in the closed position of said gate panel.

* * * * *

Dedication

3,815,932.—*Verlyn C. Ruger*, Bellevue, Mich. FRONT GATE CONSTRUCTION FOR SHOPPING CART. Patent dated June 11, 1974. Dedication filed Feb. 11, 1980, by the assignee, *Roblin Industries, Inc.*
Hereby dedicates to the Public the entire remaining term of said patent.
[*Official Gazette, April 29, 1980.*]